United States Patent Office 3,404,949
Patented Oct. 8, 1968

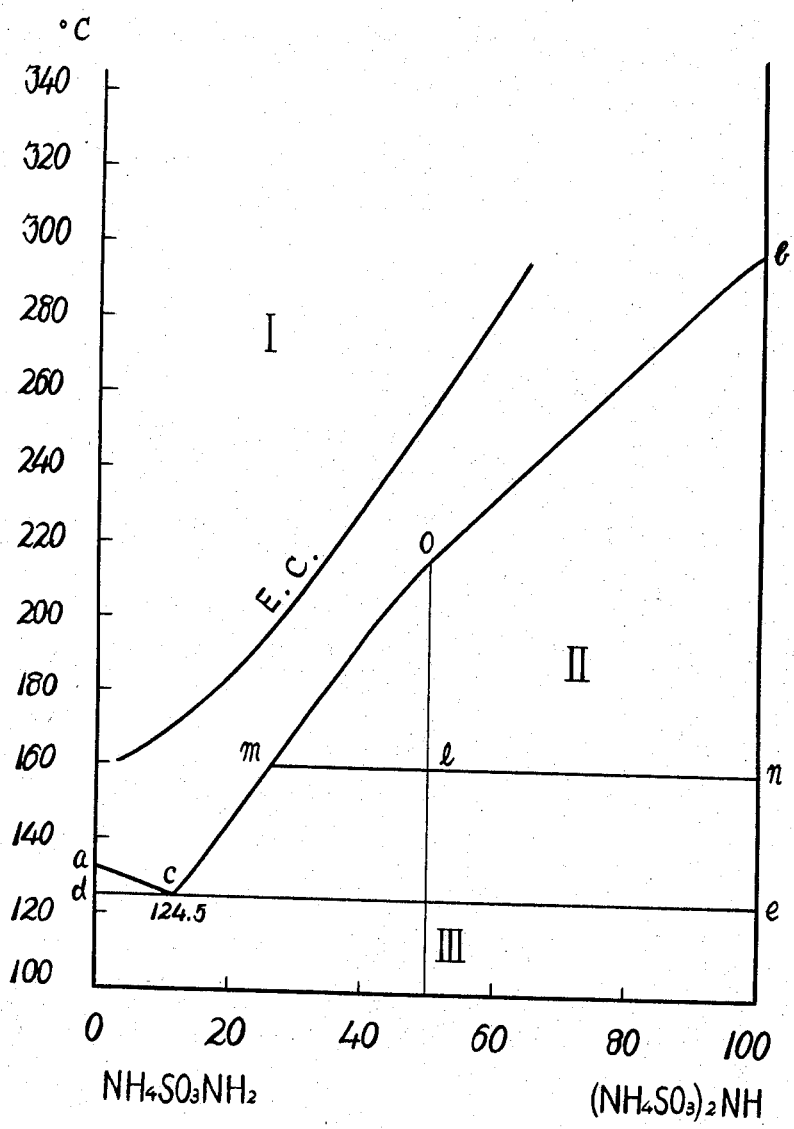

3,404,949
PROCESS FOR THE PRODUCTION OF
AMMONIUM SULFAMATE
Yukio Ito, Setagaya-ku, Tokyo, Japan, assignor to Agency of Industrial Science and Technology, Tokyo, Japan, a corporation of Japan
Filed Nov. 13, 1964, Ser. No. 410,852
Claims priority, application Japan, Nov. 16, 1963,
38/61,377
6 Claims. (Cl. 23—114)

ABSTRACT OF THE DISCLOSURE

The process for producing ammonium sulfamate in which a wholly or partially fused mixture of ammonium sulfamate with either ammonium imidodisulfonate or ammonium nitridotrisulfonate, is reacted at high temperature in a pressurized ammonia atmosphere to produce ammonium sulfamate.

---

The present invention relates to a process for the production of ammonium sulfamate based on the ammonolysis of ammonium imidodisulfonate and ammonium nitridotrisulfonate.

Although, a product which contained about 90% of ammonium sulfamate can be produced by means of the process for preparing ammonium sulfamate according to the Japanese Patent Nos. 213,417 and 246,749, it has been difficult to supply the raw material into a reaction vessel at an elevated temperature and pressure owing to the fact that the ammonium imidodisulfonate, ammonium nitridotrisulfonate or reaction products between sulfur trioxide and ammonia, comprising the above ingredients are usually in the solid state.

Further, in accordance with the German Patent No. 1,107,208, the ammonolysis to form ammonium imidodisulfonate is performed in concentrated aqueous ammonia. Said method usually permits the hydrolysis reaction to occur as well as the ammonolysis reaction. Such reaction especially occurs when low pressure ammonia was used, as is seen from the following chemical equation:

$(NH_4SO_3)_2NH + H_2O + NH_3 \rightarrow NH_4SO_3NH_2 + (NH_4)_2SO_4$

$NH_4SO_3NH + H_2O \rightarrow (NH_4)_2SO_4$

As a matter of fact, when this reaction is run at a suitable temperature, such as 170° C.–190° C., the yield of ammonium sulfamate, unless the total vapor pressure reaches to 40 atm., is significantly decreased due to the low pressure of ammonia.

Moreover, even when the vapor pressure is increased, hydrolysis cannot be prevented completely, and it causes a considerable decrease of the ammonium sulfamate yield about 10–20%, in comparison with the anhydrous reaction.

Further, there is another disadvantage in that the products obtained from the foregoing method requires further vaporizing processes for recovering the ammonium sulfamate product because it is in an ammoniacal solution.

Thus, the present invention provides a novel process for producing ammonium sulfamate without adding water in the reaction.

In the manufacturing of ammonium sulfamate, the present invention is particularly featured in that a mixture which was prepared by adding ammonium sulfamate with either ammonium imidodisulfonate or ammonium nitridotrisulfonate which are respectively secondary and tertiary amides of sulfuric acid, is heated in air or in ammonia gas and, after a part or all of the said mixture is melted, said mixture is fed into the reaction vessel. This mixture is then reacted at high temperature under pressure of ammonia gas.

In order to achieve the above process, a certain amount of ammonium sulfamate is added into the solid raw material, i.e., ammonium imidodisulfonate or ammonium nitridotrisulfonate, and, in the case of 160–320° C., the heating is carried out under the ammonia gas in order to prevent decomposition of ammonium sulfamate. Further, by heating the solid raw material in ammonia gas between 200–300° C. under normal pressure, a part of the material is changed to ammonium sulfamate by ammonolysis whereby the desired amount of fused salt containing ammonium sulfamate can be obtained.

As for the ammonium sulfamate to be added into the raw material, a reaction product derived from the present process may be used.

Further, as a raw material, a reaction product derived from anhydrous sulfur and ammonia may be used.

The present invention has been advanced by the following fundamental facts discovered by the inventor.

Ammonium imidodisulfonate melts at about 325° C. in air, while, in ammonia atmosphere, said ammonium imidodisulfonate melts at about 280° C. This proves that ammonolysis of the ammonium imidodisulfonate may occur even at one atmospheric pressure of ammonia, in this connection, a part of the ammonium imidodisulfonate transforms into ammonium sulfamate.

The above reaction results from the equilibrium of the thermal decomposition of the ammonium sulfamate:

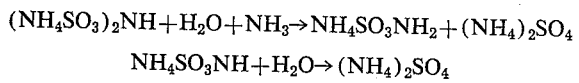

$(NH_4SO_3)_2NH + NH_3 \rightleftharpoons 2NH_4SO_3NH_2$

The content of the ammonium sulfamate having the equilibrium relation at the specified temperature, at one atmospheric pressure of ammonia follows:

| Temperature (° C.): | $NH_4SO_3NH_2$ (percent) |
|---|---|
| 160 | 94.7 |
| 180 | 77.0 |
| 200 | 66.4 |
| 230 | 63.0 |
| 250 | 53.1 |
| 280 | 42.0 |

Namely, the ammonium sulfamate does not decompose in an ammonia atmosphere beyond the above equilibrium value, even if said ammonium sulfamate were heated at 160° C. (the decomposition point)

The relationship of the melting points of $NH_4SO_3NH_2$ (melting point: 132.8° C.) and $(NH_4SO_3)_2NH$ have been indicated in the figure. The figure shows a diagram for the freezing points of $(NH_4SO_3)_2NH$—$NH_4SO_3NH_2$ system. Symbols $a$ and $b$ respectively are the melting points of $NH_4SO_3NH_2$ and $(NH_4SO_3)_2NH$, while, $c$ is a eutectic point.

Since the $NH_4SO_3NH_2$ decomposes in the region above 160° C., the measurement of the curve $b$, $c$ has been achieved in an ammonia atmosphere.

As will be apparent from the aforesaid equilibrium value specified as curve $e$, $c$, in the figure, $NH_4SO_3NH_2$ can be easily fused without decomposition in an ammonia atmosphere. In the figure, the eutectic point is shown as 124.5° C. (($NH_4SO_3)_2NH$ 12%). It will be seen that any compound or solid solution won't be produced therefrom. Further, it will be now understood that the melting point of the raw material can be freely adjustable within a temperature range, such as between 325–125° C., depending upon the mixing ratio existing between ammonium imidodisulfonate and ammonium sulfamate.

Referring now to the field I in the figure, the upper part of curves indicated by symbols $a$, $c$, $b$ respresent a uniform liquid, the field II ($b$, $c$, $e$) represents a liquid +solid —$(NH_4SO_3)_2NH$, and the lower part of the curves, field III (below line $d, e, c$) represents solid —$(NH_4SO_3)_2NH$+solid —$NH_4SO_3NH_2$ respectively.

From the above data, it can be determined that the raw material can be made to be suspended within the fused salts by incorporating ammonium sulfamate in the raw material.

For example, the composition mixed with the ammonium sulfamate which has been heated up to 160° C. or more would be treated in an ammonia atmosphere, while in the case of a temperature between 160°–125° C., heat treatment in air will be applied. Thus, a composition consisting of $(NH_4SO_3)_2NH$ and $NH_4SO_3NH_2$ in a 1:1 ratio was heated at 160° C. which has been indicated by the point $l$ in the figure. The weight ratio of the suspending solid —$(NH_4SO_3)_2NH$ and the fused salts is in the ratio $ml:nl$. Further, with increase of temperature in an ammonia atmosphere, a perfect solution can be obtained at 217° C.

Also, when ammonium imidodisulfonate is heated at a temperature between 240–320° C. in an ammonia atmosphere, a part of the ammonium imidodisulfonate transforms into ammonium sulfamate as aforementioned. Therefore, the melting point thereof can be adjusted thereby, in a manner analogous to that produced by the addition of ammonium sulfamate to the ammonium imidodisulfonate.

The ammonolysis of the ammonium imidodisulfonate in an ammonia atmosphere at an ordinary pressure has a relatively low reaction rate, however, the reaction rate may be increased, starting appr. from 240° C. and a product containing ammonium sulfamate (40–50%) can be produced at a temperature between 250–320° C.

On the other hand, with ammonium nitridotrisulfonate, the diagram of freezing points of $$NH_4SO_3NH_2—(NH_4SO_3)_3$$

does not vary when exceeding 70% of $NH_4SO_3NH_2$ (freezing point: below 160° C.) but it will be easily varied by the following decomposition:

$$(NH_4SO_3)_3N+NH_3 \rightarrow (NH_4SO_3)_2NH+NH_4SO_3NH_2$$

by means of heating at 200° C. in an ammonia atmosphere with an ordinary pressure, to produce ammonium imidodisulfonate and ammonium sulfamate, which will be then treated as described hereinbefore.

Further, the reaction products produced by reaction of ammonia and sulfur trioxide which, not containing air, at a proper reaction temperature, will contain, a significant amount of ammonium sulfamate (about 40%) in addition to the ammonium imidotrisulfonate product.

On the other hand, when using a converter gas (5–10% $SO_3$) obtained from a contact sulfuric acid plant, the content of the ammonium sulfamate product may be, at least, more than 5–15%.

If such a reaction was run at a temperature above 160° C., the ammonium imidodisulfonate will be the main product. However, ammonium nitridotrisulfonate will be the main product when using a reaction ratio $SO_3:NH_3$ (1:1.5 mole ratio), and a reaction temperature below 160° C.

These products can be also treated by the aforedescribed process. As for the reaction conditions for the pressure reaction vessel, the applicable temperature in the range 220–250° C., and higher pressure applied to the vessel tend to increase the yields of the ammonium sulfamate; however, the yields will not materially increase after exceeding 30 atm. ammonia.

In the practical method, the pressure of ammonia in the range of 30–50 atmospheres, shall be recommended. Through the application of the reaction conditions as above described, the reaction time is remarkably minimized.

As a matter of fact, a product containing more than 90% of ammonium sulfamate can be obtained within 20 minutes.

The crude ammonium sulfamate can be used as a weed killer, flame proofing agent, etc., without being refined. A refined ammonium sulfamate may be also produced by adding a liquid ammonia, conc. aqueous ammonia or ammonia-methanol solution to the crude products, and refined ammonium sulfamate extracted therefrom.

EXAMPLE 1

A mixture comprising ammonium imidodisulfonate (8.0 kgs.) and ammonium sulfamate (2.0 kgs.) was fused by being heated in an ammonia atmosphere at 280° C. Said fused salts were then supplied into a pressure reaction vessel having been prepared with 50 atm. of ammonia at a temperature range between 220–250° C. so that the ammonia is absorbed.

In the above process, ammonia is continuously supplied into the pressure reaction vessel to maintain the pressure, at least 50 atm., by stirring the products to aid the ammonia gas absorption. Thus, products containing ammonium sulfamate 92% have been obtained.

EXAMPLE 2

Ammonium nitridotrisulfonate (10.0 kgs.) was fused by heating at 260° C. in an ammonia atmosphere, and the fused salt was supplied into the pressure reaction vessel.

Through the application of a similar process to the Example 1, a product ammonium sulfamate 85% has been obtained.

EXAMPLE 3

A mixture comprising 10 kgs. of the reaction products of ammonia and converter gas from contact sulfuric acid plant, containing ammonium imidodisulfonate 85%, ammonium sulfamate 10% and sulfur-nitrogen compounds 5%, were fused at 280° C. in an ammonia atmosphere, and fed into a pressure reaction vessel of ammonia maintained at 30 atmospheric pressure.

A similar process to that of Example 1 was carried out. 10.7 kgs. of product containing 88% ammonium sulfamate was obtained.

EXAMPLE 4

A mixture comprising 5.0 kgs. of the products containing the ammonium sulfamate 88% as described in the Example 3 and 5.0 kgs. of the reaction products between sulfur trioxide and ammonia as specified in the Example 3 were so heated at a temperature between 130–160° C. until the ammonium imidodisulfonate was suspended in the fused salt. This was fed into the pressure reaction vessel, with the pressure maintained above, or, at least 30 atm., of ammonia, at 230° C. By feeding the aforesaid products into the pressure reaction vessel at 230° C., the fused salt is made to absorb the ammonia. The products are, taken out when the absorption appears to be completed.

5.3 kgs. of product containing ammonium sulfamate (88%) is obtained, and the remainder of the fused product is recycled.

While I have disclosed several embodiments of the present invention, it is to be understood that these embodiments are given by example only and not in a limiting sense, the scope of the present invention being determined by the objects and the claims.

What I claim is:

1. A method for producing ammonium sulfamate comprising reacting a wholly or partially fused reactant mixture of (i) ammonium sulfamate and ammonium imidodisulfonate, or (ii) ammonium sulfamate and ammonium nitridotrisulfonate, at an elevated temperature and in a pressurized gaseous ammonia atmosphere.

2. The process of claim 1, wherein the ammonia atmosphere is at a pressure between about 30 and 50 atmospheres.

3. The process of claim 1, wherein said reactant mixture is prepared by heating in air at a temperature between 125 and 160° C. until said mixture is at least partially fused, and then feeding said heated reactant mixture to the reaction vessel.

4. The process of claim 1, wherein said reactant mixture is prepared by heating at a temperature between 160 and 320° C. in a gaseous ammonia atmosphere until it is at least partially fused, and then feeding said heated reactant mixture to the reaction vessel.

5. The process of claim 1, wherein a mixture of ammonium sulfamate and ammonium imidodisulfonate, is prepared by heating ammonium imidodisulfonate at a temperature between 260 and 320° C. at ambient pressure in a gaseous ammonia atmosphere, whereby a fused mixture of ammonium sulfamate and ammonium imidodisulfonate is prepared, and is then fed into the reaction vessel.

6. The process of claim 1, wherein a mixture of ammonium sulfamate and ammonium nitridotrisulfonate, is prepared by heating ammonium nitridotrisulfonate at a temperature between 260 and 320° C. at ambient pressure in a gaseous ammonia atmosphere, whereby a fused mixture of ammonium sulfamate and ammonium nitridotrisulfonate is prepared, and is then fed into the reaction vessel.

References Cited

UNITED STATES PATENTS

| 2,323,241 | 2/1941 | Jones | 23—114 |
| 2,426,420 | 8/1947 | Tauch | 23—114 |

OSCAR R. VERTIZ, *Primary Examiner.*

EARL C. THOMAS, *Assistant Examiner.*